US011415703B2

(12) United States Patent
Kondo

(10) Patent No.: US 11,415,703 B2
(45) Date of Patent: Aug. 16, 2022

(54) SPOOFING DETECTION IN REAL TIME KINEMATIC POSITIONING

(71) Applicant: Magellan Systems Japan, Inc., Hyogo (JP)

(72) Inventor: Toru Kondo, Hyogo (JP)

(73) Assignee: Magellan Systems Japan, Inc., Hyogo (JP)

( * ) Notice: Subject to any disclaimer, the term of this patent is extended or adjusted under 35 U.S.C. 154(b) by 170 days.

(21) Appl. No.: 17/002,488

(22) Filed: Aug. 25, 2020

(65) Prior Publication Data

US 2021/0215829 A1    Jul. 15, 2021

Related U.S. Application Data

(63) Continuation of application No. PCT/IB2019/051347, filed on Feb. 20, 2019.

(Continued)

(51) Int. Cl.
   *G01S 19/21*    (2010.01)
   *G01S 19/44*    (2010.01)

(52) U.S. Cl.
   CPC ............ *G01S 19/215* (2013.01); *G01S 19/44* (2013.01)

(58) Field of Classification Search
   CPC .................. G01S 19/215; G01S 19/44
   See application file for complete search history.

(56) References Cited

U.S. PATENT DOCUMENTS

| 7,310,062 B1 * | 12/2007 | Hwang | ................. G01S 19/215 |
| | | | 342/357.59 |
| 9,971,037 B2 * | 5/2018 | Dickman | ................ G01S 19/23 |

(Continued)

OTHER PUBLICATIONS

Jahromi et al. "GNSS Signal Authenticity Verification Using Carrier Phase Measurement with Multiple Receivers" 2016 8th ESA Workshop on Satellite Navigation Technologies and European Workshop on GNSS Signals and Signal Processing, IEEE, Dec. 14, 2016, pp. 1-11.

(Continued)

*Primary Examiner* — Cassi J Galt
(74) *Attorney, Agent, or Firm* — Beyer Law Group LLP

(57) ABSTRACT

A GNSS receiver has a first antenna and a reference antenna. From the measurement of a carrier phase $L_1^k$ of GNSS signals at the first antenna and a reference carrier phase $L_0^k$ at the reference antenna, a single difference $L_{10}^k$ is obtained, whereby calculating a double difference $L_{10}^{k0}=L_{10}^k-L_{10}^0$ between a k-th GNSS satellite and a reference satellite (k=0). The double difference $L_{10}^{k0}$ is also predicted using known satellite position information as a function of a differencing vector $e_{k0}$ between a unit line-of-sight direction vector $e_k$ of the k-th satellite and that of the reference satellite $e_0$ and a base line vector $\Delta$ with a second integer bias $N_{10}^{k0}$. A real time kinematic (RTK) positioning solution is calculated with ambiguity resolution based on the predicted value of $L_{10}^{k0}$ and the calculated value of $L_{10}^{k0}$. A spoofing is detected if the RTK positioning solution yields $\Delta=0$.

18 Claims, 5 Drawing Sheets

Related U.S. Application Data

(60) Provisional application No. 62/635,292, filed on Feb. 26, 2018.

(56) References Cited

U.S. PATENT DOCUMENTS

| | | | |
|---|---|---|---|
| 10,908,293 B2* | 2/2021 | Whitehead | G01S 19/55 |
| 2015/0048973 A1 | 2/2015 | Whitehead | |

OTHER PUBLICATIONS

Paul Montgomery et al. "A Multi-Antenna Defense: Receiver-Autonomous GPS Spoofing Detection", https://www.insidegnss.com/auto/marapr09-montgomery.pdf, Mar. 1, 2009, pp. 40-46.
International Search Report dated Jun. 12, 2019 from International Application No. PCT/IB2019/051347.

\* cited by examiner

SPOOFING DETECTION IN REAL TIME KINEMATIC POSITIONING

CLAIM OF PRIORITY

This application is a continuation of International Application No. PCT/IB2019/051347 filed on Feb. 20, 2019, which claims priority to U.S. Provisional Application No. Patent Application No. 62/635,292, filed on Feb. 26, 2018, which is hereby incorporated by reference.

BACKGROUND OF THE INVENTION

1. Field of the Invention

The present invention relates to GNSS receivers and GNSS signal processing. More specifically, the present invention relates to detection of spoofing in Real Time Kinematic (RTK) positioning at a GNSS receiver.

2. Description of the Related Art

Global Navigation Satellite Systems (GNSS) available today include United States Global Positioning System (GPS), Russian Global Orbiting Navigation Satellite System (GLONASS), European Union's Galileo, China's regional BeiDou Satellite Navigation System (BDS, formerly known as Compass), and Japanese Quasi-Zenith Satellite System (QZSS).

A GNSS spoofing signal is a type of structured interference that is close enough to a GNSS specification so as to appear authentic to an unsuspecting GNSS receiver. An intentional spoofer deliberately attempts to manipulate the PVT (position, velocity, and time) readout of a target GNSS receiver. For example, a GNSS spoofing attack may try to deceive a GNSS receiver by broadcasting incorrect GNSS signals, structured to resemble a set of normal GNSS signals, or by rebroadcasting genuine GNSS signals captured elsewhere or at a different time ("meaconing"). These spoofed signals may be modified in such a way as to cause the GNSS receiver to estimate its position to be somewhere other than where it actually is, or to be located where it is but at a different time, as determined by the spoofing attacker. One common form of a GNSS spoofing attack, commonly termed a carry-off attack, begins by broadcasting signals synchronized with the genuine GNSS signals observed by the target GNSS receiver. The power of the counterfeit GNSS signals is then gradually increased and drawn away from the genuine GNSS signals.

Spoofing has become a more general concern as low-cost off-the shelf software-defined radio hardware, low-cost GNSS signal simulators, and record-and-play devices, etc. become available for a competent programmer to generate realistic civil GNSS signals. As economic and practical dependences on civil GNSS for transportation, location services, communication, finance, power distribution, autonomous driving vehicles and farm and construction machines, drones, robots, and other applications increase, the consequences of GNSS spoofing become more serious. Accordingly, finding effective spoofing detection in GNSS receivers is one of the urgent issues.

BRIEF DESCRIPTION OF THE INVENTION

The embodiment of the present invention provides a GNSS receiver capable of detecting spoofing in real time kinematic (RTK) positioning. The GNSS receiver includes a first antenna disposed at a first antenna position and a reference antenna at a reference antenna position, each configured to receive a plurality of GNSS signals corresponding to a plurality of GNSS satellites visible from the GNSS receiver, and a signal processor. The signal processor is configured to perform process steps including (a) setting one of the GNSS satellites as a reference satellite, (b) performing a measurement process so as to obtain a first carrier phase $L_1^k$ for the plurality of GNSS signals received at the first antenna and a reference carrier phase $L_0^k$ for the plurality of GNSS signals received at the reference antenna, (c) obtaining a first single difference $L_{10}^k$ between the first carrier phase $L_1^k$ and the reference carrier phase $L_0^k$ for the plurality of GNSS signals, (d) calculating a double difference $L_{10}^{k0}$ which is a second single difference between the first single difference $L_{10}^0$ of the reference GNSS signal and the first single difference $L_{10}^k$ of each of the remaining plurality of GNSS signals, (e) obtaining a unit direction vector $e_k$ in a line of sight direction from the reference antenna to each of the plurality of GNSS satellites based on available position information, a unit direction vector for the reference satellite being a reference unit vector $e_0$, (f) predicting the first single difference $L_{10}^k$ as a function of the unit vector $e_k$ and a baseline vector $\Delta$ between the first antenna and the reference antenna with a first integer bias $N_{10}^k$, thereby predicting the double difference $L_{10}^{k0}$ as a function of a differencing vector $e_{k0}$ between the unit direction vector $e_k$ and the reference unit vector $e_0$, and the base line vector $\Delta$, with a second integer bias $N_{10}^{k0}$, (g) calculating an RTK positioning solution with ambiguity resolution for the second integer bias $N_{10}^{k0}$ based on the calculated double difference $L_{10}^{k0}$ obtained from the measurement process and the predicted double difference $L_{10}^{k0}$, and (h) determining that a spoofing has occurred if the ambiguity resolution yields a solution with the base line vector $\Delta$ of zero.

In accordance with one embodiment of the present invention, the signal processer may be further configured to issue a notification that the spoofing has occurred.

Another aspect of the present invention provides a method for detecting spoofing in real time kinematic (RTK) positioning of a GNSS receiver which is configured to receive a plurality of GNSS signals from a plurality of GNSS satellites, and a GNSS receiver capable of performing the method. The GNSS receiver has a first antenna at a first antenna position and a reference antenna at a reference antenna position. The method includes (a) receiving a plurality of GNSS signals at the first antenna and the reference antenna, the plurality of GNSS signals corresponding to a plurality of GNSS satellites visible from the GNSS receiver, (b) setting one of the GNSS satellites as a reference satellite, (c) performing a measurement process so as to obtain a first carrier phase $L_1^k$ for the plurality of GNSS signals received at the first antenna and a reference carrier phase $L_0^k$ for the plurality of GNSS signals received at the reference antenna, (d) obtaining a first single difference $L_{10}^k$ between the first carrier phase $L_1^k$ and the reference carrier phase $L_0^k$ for the plurality of GNSS signals, (e) calculating a double difference $L_{10}^{k0}$ which is a second single difference between the first single difference $L_{10}^0$ of the reference GNSS signal and the first single difference $L_{10}^k$ of each of the remaining plurality of GNSS signals, (f) obtaining a unit direction vector $e_k$ in a line of sight from the reference antenna to each of the plurality of GNSS satellites based on available position information, a unit direction vector for the reference satellite being a reference unit vector $e_0$, (g) predicting the first single difference $L_{10}^k$ as a function of the unit vector $e_k$ and a baseline vector $\Delta$ between the first antenna and the reference antenna with a first integer bias $N_{10}^k$, thereby predicting the double difference $L_{10}^{k0}$ as a function of a differencing vector $e_{k0}$ between the unit direction vector $e_k$ and the reference unit vector $e_0$, and the base line vector $\Delta$ with a second integer bias $N_{01}^{k0}$, (h) calculating an RTK positioning solution with ambiguity resolution for the second integer bias $N_{10}^{k0}$ based on the calculated double difference $L_{10}^{k0}$ obtained from the measurement process and the predicted double difference $L_{10}^{k0}$, and (i) determining that a spoofing has occurred if the ambiguity resolution yields a solution with the base line vector $\Delta$ of zero.

The predicted double difference $L_{10}^{k0}$ may be expressed as: $L_{10}^{k0} = -e_{k0}^T \Delta + \lambda N_{10}^{k0}$, where $\lambda$ is a wave length of the carrier wave.

The second integer bias $N_{10}^{k0}$ for spoofed GNSS signals may be expressed as: $L_{10}^{k0} = \lambda N_{10}^{k0}$, where $\lambda$ is a wave length of the carrier wave.

In accordance with one embodiment of the invention, a notification that the spoofing has occurred may be issued. The number of the GNSS signals may be equal to or greater than 5.

In accordance with one embodiment of the present invention, the method may further includes issuing a notification that the spoofing has occurred.

Another aspect of the present invention provides a GNSS receiver capable of detecting spoofing in real time kinematic (RTK) positioning. The GNSS receiver including a first antenna disposed at a first antenna position and a reference antenna at a reference antenna position, each configured to receive a plurality of GNSS signals corresponding to a plurality of GNSS satellites visible from the GNSS receiver, a front end, a signal processing block, and an application processing block. The front end is configured to perform down-conversion, filtering, amplification, and digitization of the GNSS signals received at the first antenna and the reference antenna. The signal processing block is configured to acquire and track the GNSS signals received from the front end, and to generate measurements and navigation data, the measurements including a first carrier phase $L_1^k$ for the GNSS signals received at the first antenna and a reference carrier phase $L_0^k$ for the GNSS signals received at the reference antenna.

The application processing block includes (a) a measured double difference calculation section configured to (ii) calculate a first single difference $L_{10}^k$ between the first carrier phase $L_1^k$ and the reference carrier phase $L_0^k$ received from the front end for the plurality of GNSS signals, and thereby (ii) calculate a double difference $L_{10}^{k0}$ which is a second single difference between the first single difference $L_{10}^0$ of the reference GNSS signal and the first single difference $L_{10}^k$ of each of the remaining plurality of GNSS signals, (b) a double difference prediction section configured to (i) calculate a unit direction vector $e_k$ in a line of sight direction from the reference antenna to each of the plurality of GNSS satellites based on available position information, a unit direction vector for the reference satellite being a reference unit vector $e_0$, (ii) predict the first single difference $L_{10}^k$ as a function of the unit vector $e_k$ and a baseline vector $\Delta$ between the first antenna and the reference antenna with a first integer bias $N_{10}^k$, thereby (iii) predict the double difference $L_{10}^{k0}$ as a function of a differencing vector $e_{k0}$ between the unit direction vector $e_k$ and the reference unit vector $e_0$, and the base line vector $\Delta$, with a second integer bias $N_{10}^{k0}$, (c) an RTK positioning section configured to calculate an RTK positioning solution with ambiguity resolution for the second integer bias $N_{10}^{k0}$ based on the calculated double difference $L_{10}^{k0}$ obtained from the measurement process and the predicted double difference $L_{10}^{k0}$, and (d) a spoofing detection section configured to determine that a spoofing has occurred if the ambiguity resolution yields a solution with the base line vector $\Delta$ of zero.

The spoofing detection section may further be configured to issue a warning signal when it is determined that a spoofing has occurred. The GNSS receiver may further includes a signal transmitter transmitting the warning signal.

The predicted double difference $L_{10}^{k0}$ may be expressed as: $L_{10}^{k0} = -e_{k0}^T \Delta + \lambda N_{10}^{k0}$, where $\lambda$ is a wave length of the carrier wave.

The second integer bias $N_{10}^{k0}$ for spoofed GNSS signals may be expressed as: $L_{10}^{k0} = \lambda N_{10}^{k0}$, where $\lambda$ is a wave length of the carrier wave.

The number of the GNSS signals may be equal to or greater than 5.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
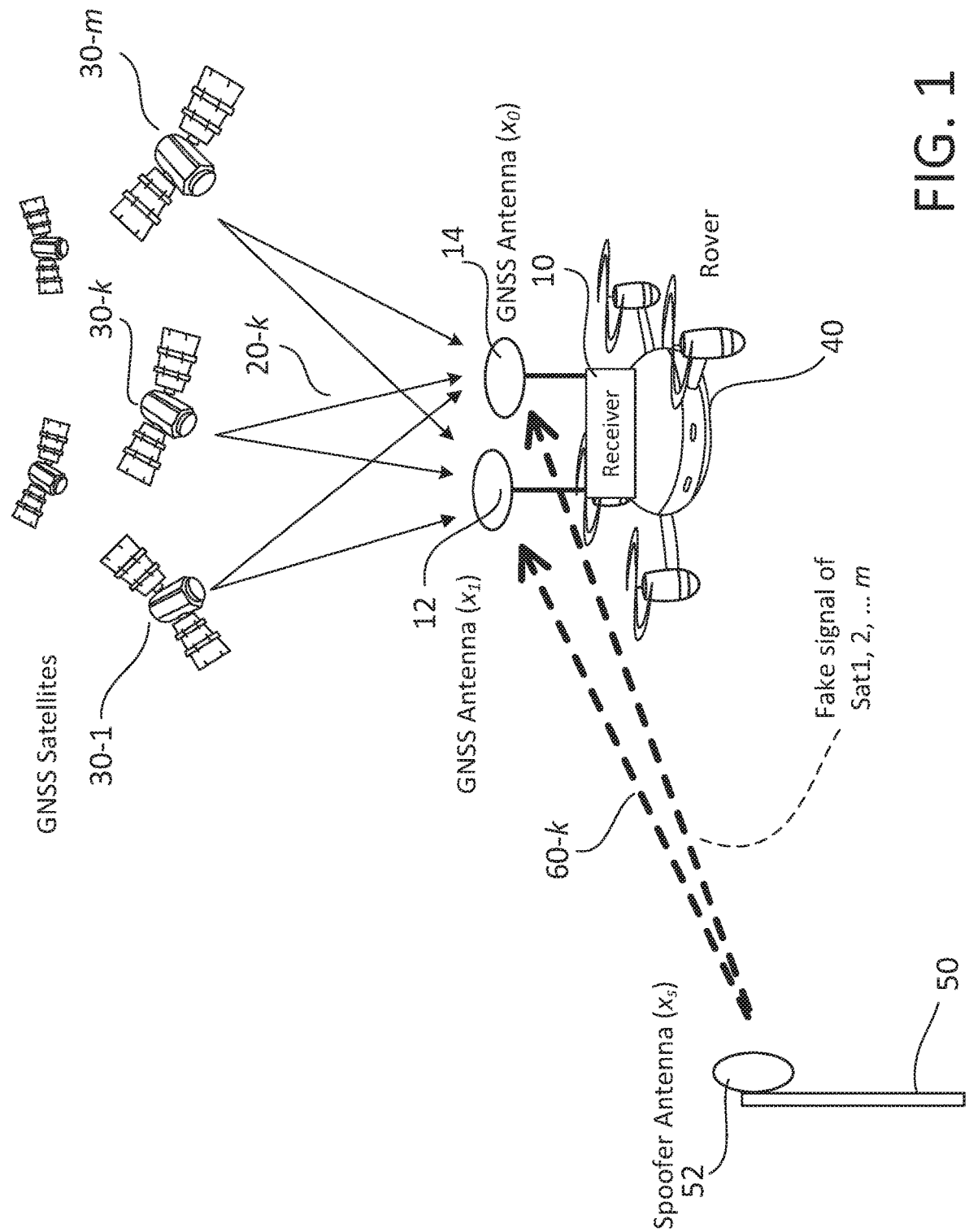
FIG. 1 is a diagram schematically illustrating a system in which embodiments of the present invention is applied.

FIG. 1 schematically illustrates a system in which embodiments of the present invention may be applied. A GNSS receiver 10 receives a plurality of GNSS signals 20 (20-$k$) from a plurality of GNSS satellites 30 (30-$k$). It is assumed that the satellite positions are known, for example, as they are computed using assistance information such as broadcast ephemeris information, or calculated from precise orbits. Such assistance information may be stored in a memory of the GNSS receiver 10 or obtained through a connection link such as the Internet or radio communication.

The GNSS receiver 10 is provided with a first antenna 12 at a first antenna position $x_1$ and a reference antenna 14 at a reference antenna position $x_0$. The first antenna 12 and the reference antenna 14 are configured to receive a plurality (m) of GNSS signals 20 corresponding to a plurality (m) of GNSS satellites 30, where m is an integer equal to or greater than five (5). For example, such a plurality (m) of GNSS signals are some or all of the GNSS signals from GNSS satellites visible from the GNSS receiver 10 (the first antenna 12 and the reference antenna 14). It is also assumed that at least five (5) GNSS satellites are acquired and being tracked. Among the m GNSS signals, a k-th GNSS signal 20-$k$ corresponds to the k-th GNSS satellite 30-$k$ among the m GNSS satellites, where k is an integer. One of the m GNSS satellites 30, for example, the highest GNSS satellite in the view, is set as a reference satellite (0-th GNSS satellite), and the corresponding GNSS signal is referred to as a reference signal (k=0).

It should be noted that the GNSS satellites may transmit using more than one frequency bands, i.e., transmit more than one GNSS signals. In such a case, the GNSS receiver 10 may receive multiple GNSS signals from one GNSS satellite which are acquired, tracked, and processed as separate GNSS signals.

As shown in FIG. 1, the GNSS receiver 10 may be disposed on a rover 40 such as a drone, moving vehicle, or the like. Thus, a distance between the first antenna 12 and the reference antenna 14 may be in a range of a few decimeters to several meters. The GNSS receiver 10 implementing the present invention may be configured as a signal processor or a computer including a CPU, a memory (RAM, ROM), and the like therein. The functions and processing blocks of the GNSS receiver 10 described below may be realized by means of software/computer programs realizing the respective functions, but a part or the whole of them may be realized by hardware.

Figure 2:
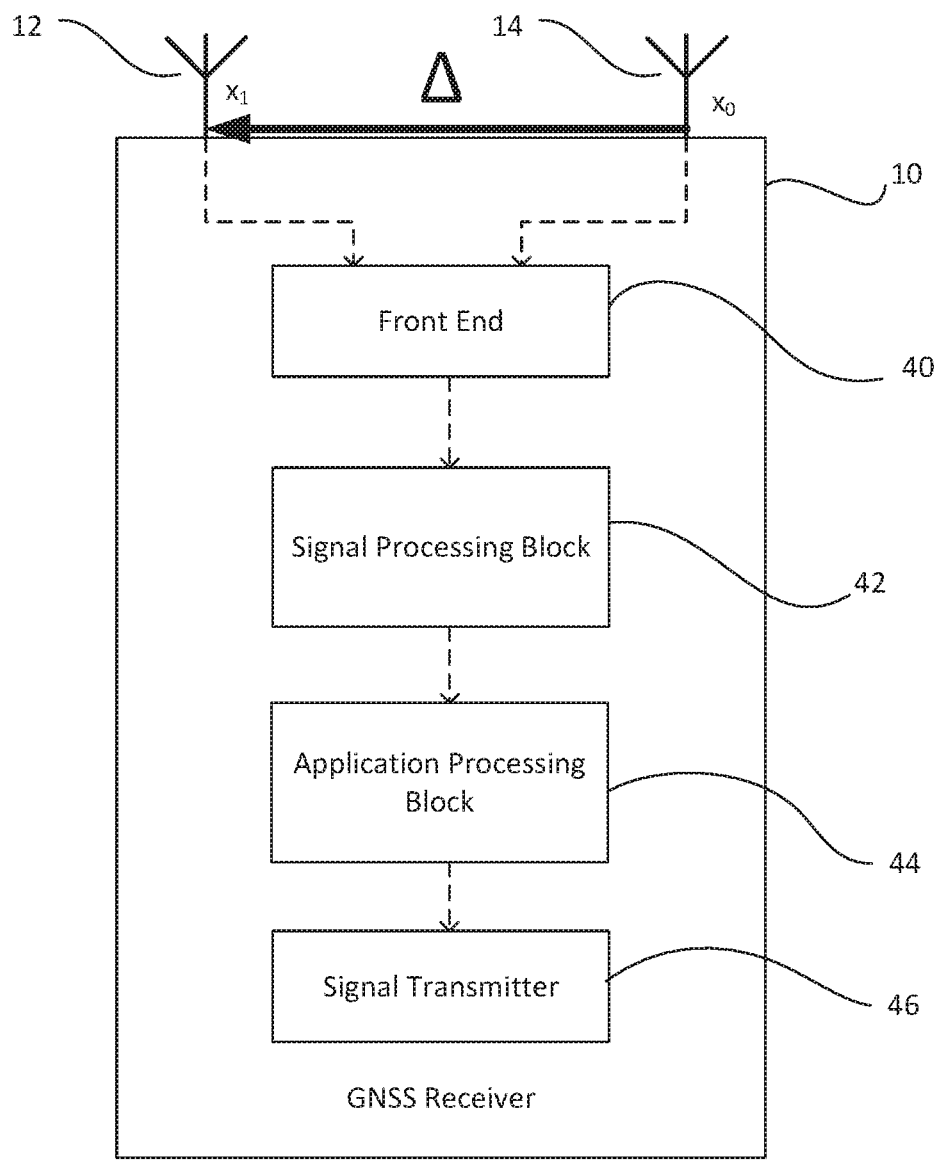
FIG. 2 is a block diagram schematically illustrating a GNSS receiver in accordance with one embodiments of the present invention.

FIG. 2 schematically illustrates an example of the GNSS receiver 10 having the first and reference antennas 12 and 14. As shown in FIG. 2, the GNSS receiver 10 may include a front end 40, a signal processing block 42, and an application processing block 44. The front end 40 down-converts, filters, amplifies, and digitizes the incoming GNSS signals received by the first and reference antennas 12 and 14. The signal processing block 42 acquires and tracks the GNSS signals, and generates measurements and navigation data, and additional signal information. For example, the signal processing block 42 performs baseband processing and provides observables, including code pseudo-ranges and carrier phase measurements, as well as navigation data. Additional information, such as Doppler frequency, Carrier-to-Noise ratio, or lock indicators, can also be provided. The application processing block 44 performs various computations using the measurements (observables) and the navigation data, and generates information such as Position, Velocity, and Timing (PVT) information, among others. The GNSS receiver 10 may also includes a signal transmitter 46 and a memory (not shown).

As shown in FIG. 1, a spoofing attacker may set up a spoofer 50 such as a spoofing device having a spoofer antenna 52 from which disguised (fake) GNSS signals 60 (60-$k$) are broadcast. k is an integer representing the k-th disguised GNSS signal corresponding to the k-th legitimate GNSS signal. It is assumed that the spoofer 40 knows which GNSS satellites 30 are possibly visible from the GNSS receiver 10 which is a target of the spoofing. Typically, the spoofer 50 starts transmitting such disguised GNSS signals 60-$k$ with a small magnitude, and then gradually increases the magnitude such that the legitimate GNSS signals 30-$k$ from the GNSS satellites 20-$k$ are taken over by the much stronger disguised GNSS signals 60-$k$. Accordingly, it is assumed that once spoofing has occurred, all of the GNSS signals being received and tracked by the GNSS receiver 10 are disguised GNSS signals 60-$k$. It is also assumed that the spoofer 50 uses a single transmitting antenna (spoofer antenna) 52.

Using the GNSS receiver 10, such spoofing can be detected in real time kinematic (RTK) positioning in accordance with one embodiment of the present invention. The spoofer 50 may transmit the disguised GNSS signals 60-$k$ corresponding to some or all of the m GNSS satellites 30-$k$ visible to the GNSS receiver 10. Thus, under the risk of such a spoofing attack, the GNSS signals being received and tracked by the GNSS receiver 10 may or may not the legitimate GNSS signals 30-$k$. In accordance with one embodiment of the present invention, the GNSS receiver 10 performs spoofing detection via RTK positioning as described below.

When no spoofing occurs, the basic equations for RTK positioning related to the carrier phase (range) are defined as follows:

$$L_0^k = |x^k - x_0| + C(\tau_0 - \tau^k) + \lambda N_0^k$$

$$L_1^k = |x^k - x_1| + C(\tau_1 - \tau^k) + \lambda N_1^k$$

where k is a satellite number indicating that variables/parameters are that of the k-th GNSS satellite, L is an observation value of the carrier phase, $x^k$ is a position of the k-th GNSS satellite, $\tau_0$ and $\tau_1$ are clock biases at the reference antenna position $x_0$ and the first antenna position $x_1$, respectively, $\tau^k$ is a clock bias of the k-th GNSS satellite, $N_0^k$ and $N_1^k$ are integer value biases (carrier phase ambiguities) of the k-th GNSS satellite at the reference antenna position $x_0$ and the first antenna position $x_1$, respectively. C is the speed of light, $\lambda$ is a wave length of the carrier wave.

Figure 3A:
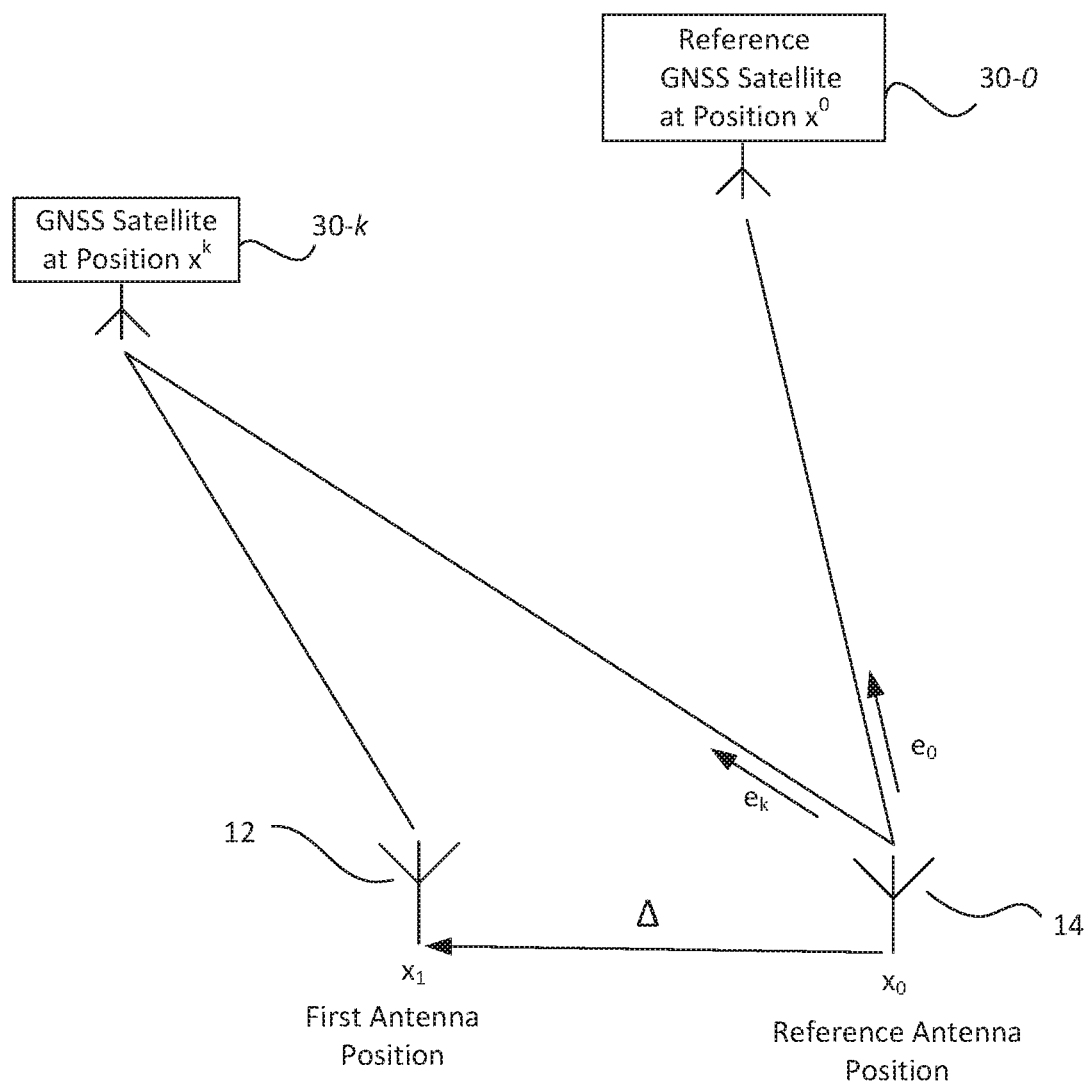
FIGS. 3A and 3B are diagrams explaining vectors used in the RTK positioning in accordance with one embodiment of the present invention.

Suppose the base line vector $\Delta$ between the first antenna position $x_1$ and the reference antenna position $x_0$ satisfies $x_1 = x_0 + \Delta$, as shown in FIGS. 2 and 3A, the single difference in the observation value L of the charier phase between the first antenna position $x_1$ and the reference antenna position $x_0$ is expressed by the following equation:

$$\begin{aligned} L_{10}^k &= |x^k - x_1| - |x^k - x_0| + C\tau_{10} + \lambda N_{10}^k \\ &= |x^k - x_0 - \Delta| - |x^k - x_0| + C\tau_{10} + \lambda N_{10}^k \\ &\cong -\frac{(x^k - x_0)^T}{|x^k - x_0|}\Delta + C\tau_{10} + \lambda N_{10}^k \\ &= -e_k^T \Delta + C\tau_{10} + \lambda N_{10}^k \end{aligned}$$

where $$\frac{(x^k - x_0)}{|x^k - x_0|}$$

is a unit vector in the line of sight direction from the reference antenna 14 to the k-th satellite, and set to $e_k$, as shown in FIG. 3A.

Thus, using the available position information of each GNSS satellite as mentioned above, the first single difference $L_{10}^k$ is predicted as a function of the unit vector $e_k$ in the line of sight direction from the reference antenna 14 to the k-th satellite 30-$k$ and the baseline vector $\Delta$ between the first antenna position $x_1$ and the reference antenna position $x_0$ with a first integer bias $N_{10}^k$.

The satellite number k of the reference satellite is set to 0, and by taking a single difference in the single difference $L_{10}^k$ between the satellites (i.e., a double difference of the carrier phase L between the antenna positions and between the satellite positions), the following expression (1) is obtained:

$$L_{10}^{k0} = -e_{k0}^T \Delta + \lambda N_{10}^{k0} \quad (1)$$

Figure 3B:
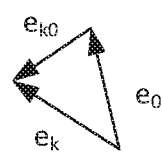

That is, the double difference $L_{10}^{k0}$ is predicted based on the predicted first single difference $L_{10}^k$ of the k-th GNSS signal and that of the reference GNSS signal $L_{10}^0$ as a function of a differencing vector $e_{k0}$ between the unit vector $e_k$ of the k-th GNSS satellite and the unit vector $e_0$ of the reference satellite, and the base line vector $\Delta$ with a second integer bias $N_{10}^{k0}$. The differencing vector $e_{k0}$ between the unit direction vector $e_k$ and the unit reference vector $e_0$ is shown in FIG. 3B. The RKT positioning is performed with this relational expression (1).

On the other hand, if the fake or disguised GNSS signal 60-k corresponding to the k-th GNSS satellite is transmitted from the spoofer antenna 52 at a spoofer position $x_s$, the RTK positioning equations for the carrier phase with respect to the spoofer signals 60-k are as follows:

$$L_0^k = |x_s - x_0| + C(\tau_0 - T^k) + \lambda N_0^k$$

$$L_1^k = |x_s - x_1| + C(\tau_1 - T^k) + \lambda N_1^k$$

where $T^k$ is a clock bias deliberately applied by the spoofer 50 to cause the GNSS receiver 10 to calculate the incorrect position.

By taking a double difference of the carrier phase L between the antenna positions and between the disguised satellite positions (i.e., the same spoofer antenna position $x_s$ for all GNSS signals k=0, 1, 2, . . . , m), the following equation is obtained:

$$L_{10}^{k0} = \lambda N_{10}^{k0} \quad (2)$$

That is, if an RTK engine in the application processor obtains estimated or predicted values of the base line vector $*\Delta$ and the carrier phase ambiguity $*N_{10}^{k0}$ ($*$denotes estimated values), assuming the GNSS signals are coming from the corresponding GNSS satellites using the expression (1), the RTK engine will solve the following equation:

$$L_{10}^{k0} = \lambda N_{10}^{k0} = -e_{k0}^T * \Delta + \lambda * N_{10}^{k0}$$

When the ambiguity resolution (AR) is successfully done, the estimated carrier phase ambiguity and the observation value thereof should match, that is, $$*N_{10}^{k0} = N_{10}^{k0}$$

$$\Delta = 0$$

That is, if the ambiguity fixing of the base line vector 0 is found, it can be considered that spoofing is occurred. In accordance with this method, spoofing using a single transmit antenna and meaconing using a single antenna can be detected.

Figure 4:
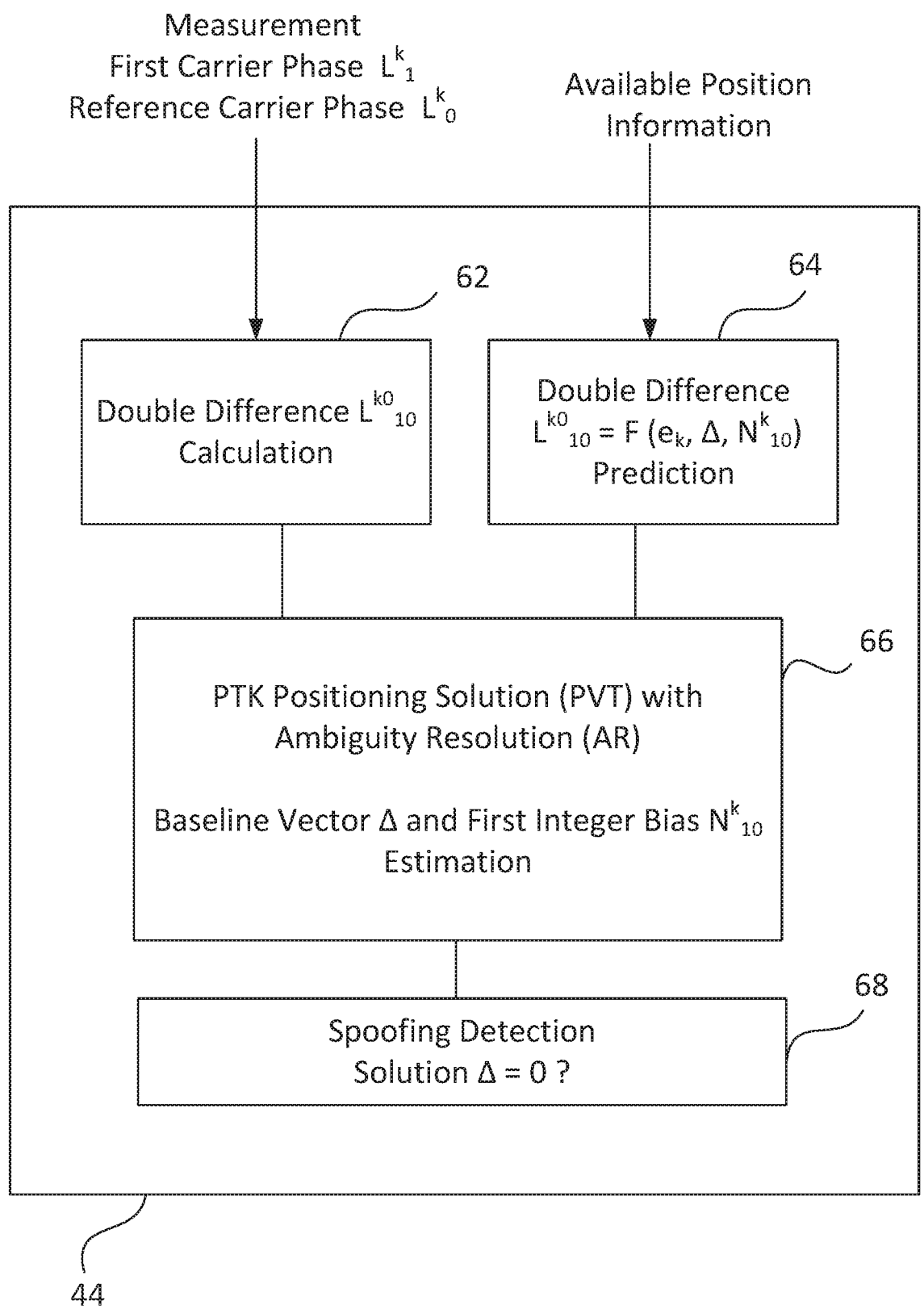
FIG. 4 is a block diagram schematically illustrating an example of an application processing block in accordance with one embodiments of the present invention.

In accordance with one embodiment of the present invention, the spoofing detection may be performed by the application processing block (processor) 44 of the GNSS receiver 10. FIG. 4 schematically illustrates an example of the application processing block 44 in accordance with one embodiment of the present invention. The application processing block 44 includes a double difference calculation section 62, a double difference prediction section 64, an RTK engine 66, and a spoofing detection section 68. It should be noted that some or all of the double difference calculation section 62, the double difference prediction section 64, and the spoofing detection section 68 may be implemented as part of the RTK engine 66.

The double difference calculation section 62 obtains the double difference $L_{10}^{k0}$ between the first single difference $L_{10}^k$ of the k-th GNSS signal and the first single difference $L_{10}^0$ of the reference signal, where the first single difference $L_{10}^k$ is a difference between the first carrier phase $L_1^k$ (received at the first antenna) and the reference carrier phase $L_0^k$ (received at the reference antenna) of the GNSS signal 20-k, and the first single difference $L_{10}^0$ is a difference between the first carrier phase $L_1^0$ (received at the first antenna) and the reference carrier phase $L_0^0$ (received at the reference antenna) of the reference signal (i.e., k=0). Thus, the double difference calculation section 60 obtains the double difference $L_{10}^{k0}$ based on the measurement (the first carrier phase M and the reference carrier phase $L_0^k$) obtained from the signal processing block 42.

On the other hand, the double difference calculation section 62 first obtains (predicts) the first single difference $L_{10}^k$ as a function of the unit vector $e_k$ and a baseline vector $\Delta$ between the first antenna 12 and the reference antenna 14 with a first integer bias $N_{10}^k$, where the unit vector $e_k$ is a unit vector in the line of sight direction from the reference antenna 14 (reference position $x_0$) to the k-th satellite 30-k. Then, the double difference calculation section 62 predicts the double difference $L_{10}^{k0}$ as a function of a differencing vector $e_{k0}$ between the unit direction vector $e_k$ and the reference unit vector $e_0$, and the base line vector $\Delta$, with a second integer bias $N_{10}^{k0}$, where the reference unit vector $e_0$ is a unit vector in the line of sight direction from the reference antenna 14 (reference position $x_0$) to the reference satellite.

Based on the measured double difference $L_{10}^{k0}$ obtained from the double difference calculation section 62 and the predicted double difference $L_{10}^{k0}$ obtained from the double difference prediction section 64, the RTK engine 66 performs the RTK positioning so as to calculate the PVT solution with ambiguity resolution, in which the base line vector $\Delta$ and the first integer bias $N_{10}^{k0}$ are estimated. The spoofing detection section 68 determines that a spoofing has occurred if the ambiguity resolution yields a solution with the base line vector is 0, i.e., the ambiguity is fixed when the base line vector $\Delta=0$. When the spoofing is detected, a warning signal may be issued and transmitted via the transmitter 46, the RTK positioning process may be halted for a predetermined time period in order to avoid the wrong information is being used by other applications.

Figure 5:
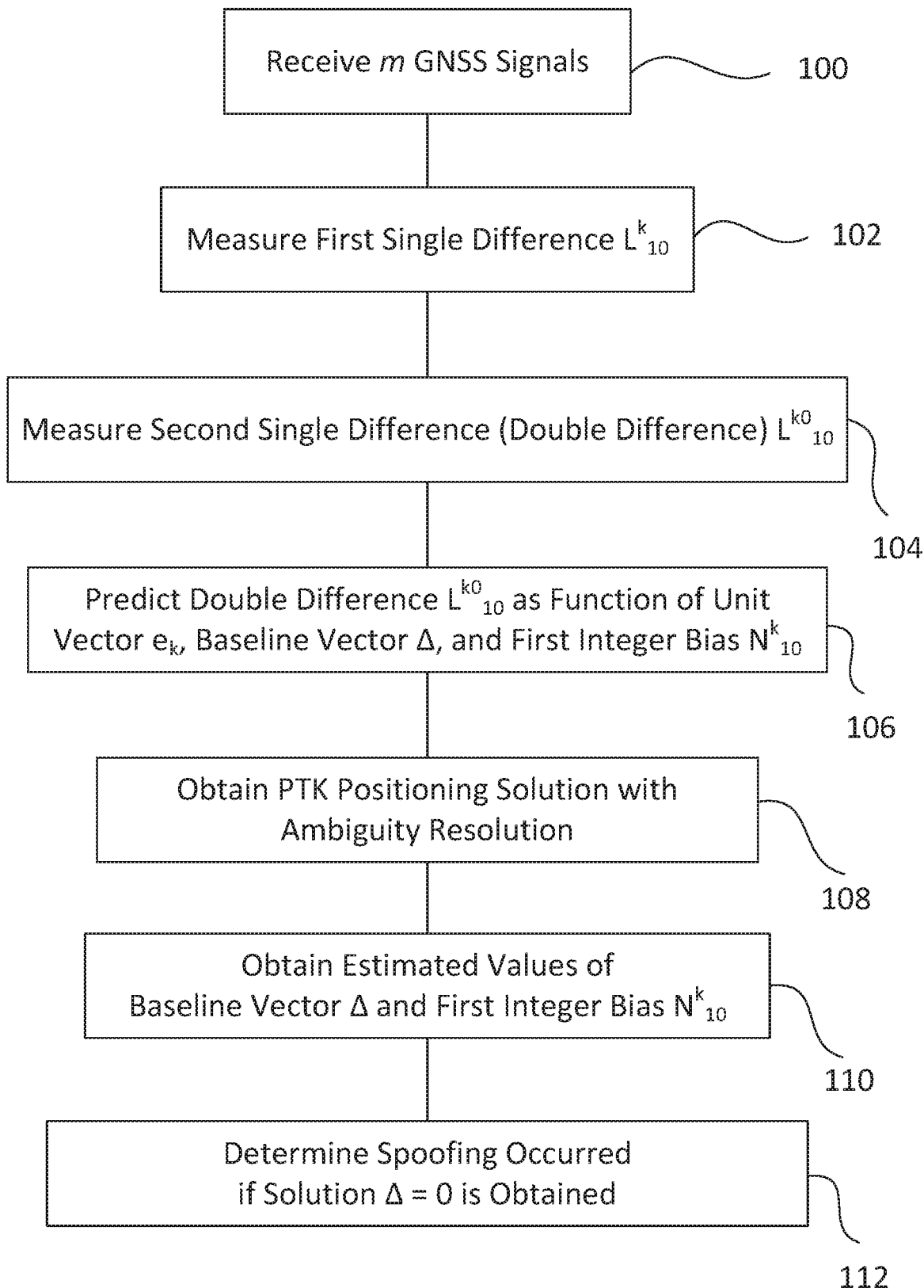
FIG. 5 is a flow chart showing process steps of a method for detecting spoofing in accordance with one embodiment of the present invention.

FIG. 5 shows process steps of a method for detecting spoofing in accordance with one embodiment of the present invention, where the GNSS receiver has a first antenna at a first antenna position and a reference antenna at a reference antenna position. As shown in FIG. 5, a plurality (m) GNSS signals corresponding to a plurality (m) GNSS satellites are received at the first antenna and the reference antenna (100). The m GNSS satellites are some or all of GNSS satellites visible from the GNSS receiver. The GNSS satellites possibly visible from the antenna positions are knowable from available assistance information including satellite position information such as ephemeris data. It should be noted that, with a possibility of spoofing, the GNSS signals being received may or may not actually come from the GNSS satellites, but may be transmitted from a spoofer antenna unknown to the GNSS receiver. Once such a spoofing has occurred, it is assumed that all of the GNSS signals being received are disguised GNSS signals.

One of the GNSS satellites is set as a reference satellite and a corresponding GNSS signal is set as a reference signal (k=0) (102). Using carrier phase measurement process, a first carrier phase $L_1^k$ is obtained for the plurality of GNSS signals received at the first antenna, and a reference carrier phase $L_0^k$ is obtained for the plurality of GNSS signals received at the reference antenna as observation values (104). Then, the first single difference is taken between the two antennas. That is, a first single difference $L_{10}^k$ between the first carrier phase $L_1^k$ and the reference carrier phase $L_0^k$ are calculated for the plurality of GNSS signals, where k is an integer from 1 to m, and the k-th GNSS signal corresponds to the k-th GNSS satellite (106).

Then, the second single difference is taken between the GNSS satellites. That is, a double difference $L_{10}^{k0}$ which is a second single difference between the first single difference $L_{10}^k$ of the k-th GNSS satellite and the first single difference $L_{10}^0$ of the reference satellite is calculated (108).

On the other hand, using available position information as mentioned above, the first single difference $L_{10}^k$ is predicted as a function of a unit vector $e_k$ in a line of sight direction from the reference antenna to the k-th satellite and a baseline vector Δ between the first antenna and the reference antenna with a first integer bias $N_{10}^k$, and thus the double difference $L_{10}^{k0}$ is also predicted based on the predicted first single differences $L_{10}^k$ and $L_{10}^0$ as a function of a differencing vector $e_{k0}$ between the unit vector $e_k$ of the k-th GNSS satellite and the unit vector $e_0$ of the reference satellite, and the base line vector Δ with a second integer bias $N_{10}^{k0}$ (110).

The RTK positioning solution for the m GNSS signals is calculated with ambiguity resolution (AR) based on the predicted double difference $L_{10}^{k0}$, and the calculated double difference $L_{10}^{k0}$ obtained from the measurement process (112). If the ambiguity resolution is successfully done, the estimated carrier phase ambiguity $*N_{10}^{k0}$ and the observation value of the carrier phase ambiguity $N_{10}^{k0}$ matches, as mentioned above, thereby yielding a solution with the base line vector Δ=0. Accordingly, if it is found that the ambiguity is resolved with the base line vector 0, it is determined that a spoofing has occurred (114). These process steps may be performed by the application processing block 44 discussed above. When a spoofing is detected, a notification may be issued from the processor 10, or the positioning process may be halted. For example, the signal transmitter 46 (shown in FIG. 2) may be used to issue such a notification.

In accordance with one embodiment of the present invention, the method as described above may be implemented in a non-transitory computer-readable storage medium with an executable program stored thereon. The program instructs a microprocessor to perform the method described above.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A GNSS receiver capable of detecting spoofing in real time kinematic (RTK) positioning, the GNSS receiver comprising:
    a first antenna disposed at a first antenna position and a reference antenna at a reference antenna position, each configured to receive a plurality of GNSS signals corresponding to a plurality of GNSS satellites visible from the GNSS receiver;
    a signal processor configured to perform process steps including:
        setting one of the GNSS satellites as a reference satellite;
        performing a measurement process so as to obtain a first carrier phase $L_1^k$ for the plurality of GNSS signals received at the first antenna and a reference carrier phase $L_0^k$ for the plurality of GNSS signals received at the reference antenna;
        obtaining a first single difference $L_{10}^k$ between the first carrier phase $L_1^k$ and the reference carrier phase $L_0^k$ for the plurality of GNSS signals;
        calculating a double difference $L_{10}^{k0}$ which is a second single difference between the first single difference $L_{10}^0$ of the reference GNSS signal and the first single difference $L_{10}^k$ of each of the remaining plurality of GNSS signals;
        obtaining a unit direction vector $e_k$ in a line of sight direction from the reference antenna to each of the plurality of GNSS satellites based on available position information, a unit direction vector for the reference satellite being a reference unit vector $e_0$;
        predicting the double difference $L_{10}^{k0}$ as a function of a differencing vector $e_{k0}$ between the unit direction vector $e_k$ and the reference unit vector $e_0$, and a base line vector Δ between the first antenna and the reference antenna, with an integer bias $N_{10}^{k0}$;
        calculating an RTK positioning solution with ambiguity resolution for the integer bias $N_{10}^{k0}$ based on the calculated double difference $L_{10}^{k0}$ obtained from the measurement process and a relational expression used for predicting the double difference $L_{10}^{k0}$; and
        determining that a spoofing has occurred if the ambiguity resolution yields a solution with the base line vector Δ of zero.

2. The GNSS receiver of claim 1, wherein the relational expression for predicting the double difference $L_{10}^{k0}$ is expressed as:

$$L_{10}^{k0} = -e_{k0}^T \Delta + \lambda N_{10}^{k0}$$

where λ is a wave length of the carrier wave.

3. The GNSS receiver of claim 1, wherein the integer bias $N_{10}^{k0}$ for spoofed GNSS signals is expressed as:

$$L_{10}^{k0} = \lambda N_{10}^{k0}$$

where λ is a wave length of the carrier wave.

4. The GNSS receiver of claim 1, wherein the signal processor is further configured to issue a notification that the spoofing has occurred.

5. The GNSS receiver of claim 1, wherein a number of the GNSS signals is equal to or greater than 5.

6. A method for detecting spoofing in real time kinematic (RTK) positioning of a GNSS receiver, the GNSS receiver having a first antenna at a first antenna position and a reference antenna at a reference antenna position, the method comprising:
    receiving a plurality of GNSS signals at the first antenna and the reference antenna, the plurality of GNSS signals corresponding to a plurality of GNSS satellites visible from the GNSS receiver;
    setting one of the GNSS satellites as a reference satellite;
    performing a measurement process so as to obtain a first carrier phase $L_1^k$ for the plurality of GNSS signals received at the first antenna and a reference carrier phase $L_0^k$ for the plurality of GNSS signals received at the reference antenna;

obtaining a first single difference $L_{10}^k$ between the first carrier phase $L_1^k$ and the reference carrier phase $L_0^k$ for the plurality of GNSS signals;

calculating a double difference $L_{10}^{k0}$ which is a second single difference between the first single difference $L_{10}^0$ of the reference GNSS signal and the first single difference $L_{10}^k$ of each of the remaining plurality of GNSS signals;

obtaining a unit direction vector $e_k$ in a line of sight direction from the reference antenna to each of the plurality of GNSS satellites based on available position information, a unit direction vector for the reference satellite being a reference unit vector $e_0$;

predicting the double difference $L_{10}^{k0}$ as a function of a differencing vector $e_{k0}$ between the unit direction vector $e_k$ and the reference unit vector $e_0$ and a base line vector $\Delta$ between the first antenna and the reference antenna, with an integer bias $N_{10}^{k0}$;

calculating an RTK positioning solution with ambiguity resolution for the integer bias $N_{10}^{k0}$ based on the calculated double difference $L_{10}^{k0}$ obtained from the measurement process and a relational expression used for predicting the double difference $L_{10}^{k0}$; and determining that a spoofing has occurred if the ambiguity resolution yields a solution with the base line vector $\Delta$ of zero.

7. The method of claim 6, wherein the relational expression for predicting the double difference $L_{10}^{k0}$ is expressed as:

$$L_{10}^{k0} = -e_{k0}^T \Delta + \lambda N_{10}^{k0}$$

where $\lambda$ is a wave length of the carrier wave.

8. The method of claim 6, wherein the integer bias $N_{10}^{k0}$ for spoofed GNSS signals is expressed as:

$$L_{10}^{k0} = \lambda N_{10}^{k0}$$

where $\lambda$ is a wave length of the carrier wave.

9. The method of claim 6, further comprising:
issuing a notification that the spoofing has occurred.

10. The method of claim 6, wherein a number of the GNSS signals is equal to or greater than 5.

11. A GNSS receiver capable of detecting spoofing in real time kinematic (RTK) positioning, the GNSS receiver comprising:

a first antenna disposed at a first antenna position and a reference antenna at a reference antenna position, each configured to receive a plurality of GNSS signals corresponding to a plurality of GNSS satellites visible from the GNSS receiver;

a front end configured to perform down-conversion, filtering, amplification, and digitization of the GNSS signals received at the first antenna and the reference antenna;

a signal processing block configured to acquire and track the GNSS signals received from the front end, and to generate measurements and navigation data, the measurements including a first carrier phase $L_1^k$ for the GNSS signals received at the first antenna and a reference carrier phase $L_0^k$ for the GNSS signals received at the reference antenna;

an application processing block including:
a measured double difference calculation section configured to:
calculate a first single difference $L_{10}^k$ between the first carrier phase $L_1^k$ and the reference carrier phase $L_0^k$ received from the front end for the plurality of GNSS signals; and
thereby calculate a double difference $L_{10}^{k0}$ which is a second single difference between the first single difference $L_{10}^0$ of the reference GNSS signal and the first single difference $L_{10}^k$ of each of the remaining plurality of GNSS signals;

a double difference prediction section configured to:
calculate a unit direction vector $e_k$ in a line of sight direction from the reference antenna to each of the plurality of GNSS satellites based on available position information, a unit direction vector for the reference satellite being a reference unit vector $e_0$;
predict the double difference $L_{10}^{k0}$ as a function of a differencing vector $e_{k0}$ between the unit direction vector $e_k$ and the reference unit vector $e_0$, and a base line vector $\Delta$ between the first antenna and the reference antenna, with an integer bias $N_{10}^{k0}$;

an RTK positioning section configured to calculate an RTK positioning solution with ambiguity resolution for the integer bias $N_{10}^{k0}$ based on the calculated double difference $L_{10}^{k0}$ obtained from the measurement process and a relational expression used for predicting the double difference $L_{10}^{k0}$; and a spoofing detection section configured to determine that a spoofing has occurred if the ambiguity resolution yields a solution with the base line vector $\Delta$ of zero.

12. The GNSS receiver of claim 11, wherein the spoofing detection section is further configured to issue a warning signal when it is determined that a spoofing has occurred.

13. The GNSS receiver of claim 12, further comprising:
a signal transmitter transmitting the warning signal.

14. The GNSS receiver of claim 11, wherein the relational expression for predicting the double difference $L_{10}^{k0}$ is expressed as:

$$L_{10}^{k0} = -e_{k0}^T \Delta + \lambda N_{10}^{k0}$$

where $\lambda$ is a wave length of the carrier wave.

15. The GNSS receiver of claim 11, wherein the integer bias $N_{10}^{k0}$ for spoofed GNSS signals is expressed as:

$$L_{10}^{k0} = \lambda N_{10}^{k0}$$

where $\lambda$ is a wave length of the carrier wave.

16. The GNSS receiver of claim 1, wherein a distance between the first antenna and the reference antenna is arrange of a few decimeters to several meters.

17. The method of claim 6, wherein a distance between the first antenna and the reference antenna is arrange of a few decimeters to several meters.

18. The GNSS receiver of claim 11, wherein a distance between the first antenna and the reference antenna is arrange of a few decimeters to several meters.

* * * * *